(12) United States Patent
Kroczek et al.

(10) Patent No.: US 12,552,658 B2
(45) Date of Patent: Feb. 17, 2026

(54) WATER PORT CLOSURE ASSEMBLY

(71) Applicant: B/E AEROSPACE, INC., Winston Salem, NC (US)

(72) Inventors: Piotr Jacek Kroczek, Nieciszów (PL); Dariusz Celestyn Sapija, Kiełczówek (PL)

(73) Assignee: B/E AEROSPACE, INC., Winston Salem, NC (US)

( * ) Notice: Subject to any disclaimer, the term of this patent is extended or adjusted under 35 U.S.C. 154(b) by 0 days.

(21) Appl. No.: 18/416,251

(22) Filed: Jan. 18, 2024

(65) Prior Publication Data
US 2024/0253969 A1    Aug. 1, 2024

(30) Foreign Application Priority Data

Jan. 26, 2023    (EP) .................................. 23461505

(51) Int. Cl.
*B67D 7/02*    (2010.01)
*F16K 5/06*    (2006.01)
*F16K 37/00*   (2006.01)

(52) U.S. Cl.
CPC .......... *B67D 7/0294* (2013.01); *F16K 5/0647* (2013.01); *F16K 37/0008* (2013.01)

(58) Field of Classification Search
CPC .. B67D 7/0294; F16K 5/0647; F16K 37/0008
See application file for complete search history.

(56) References Cited

U.S. PATENT DOCUMENTS

| | | | | |
|---|---|---|---|---|
| 246,538 | A | * | 8/1881 | Mullaney ................ F16L 37/56 |
| | | | | 137/862 |
| 3,116,755 | A | * | 1/1964 | Mcneal ................. F16K 11/166 |
| | | | | 137/599.14 |
| 3,423,063 | A | | 1/1969 | German |
| 4,422,618 | A | | 12/1983 | Lawson |
| 4,445,664 | A | | 5/1984 | Allread |
| 4,928,731 | A | | 5/1990 | Koller |
| 5,462,086 | A | * | 10/1995 | Taylor .................. F16K 17/048 |
| | | | | 137/865 |

(Continued)

OTHER PUBLICATIONS

European Patent Office; European Search Report filed Sep. 14, 2023 in Application No. 23461505.2.

*Primary Examiner* — Angelisa L. Hicks
(74) *Attorney, Agent, or Firm* — SNELL & WILMER L.L.P.

(57) ABSTRACT

A fill port assembly comprising: a housing having an opening therethrough; a fill port located in and extending through the opening defining a flow channel through the fill port from a first end to a second end, the flow channel having an axis defined between the first end and the second end; and a closure mechanism moveable between an open position in which the flow channel is open and allows fluid flow therethrough and a closed position in which the flow channel is closed and prevents fluid flow therethrough, wherein the closure mechanism comprises: a ball located in the flow channel, the ball having a passage therethrough, the ball being rotatable within the flow channel such that in the open position, the passage is aligned with the flow channel and in the closed position, the passage is not aligned with the flow channel.

7 Claims, 12 Drawing Sheets

(56) References Cited

U.S. PATENT DOCUMENTS

| | | | | |
|---|---|---|---|---|
| 6,206,028 B1* | 3/2001 | Holden | ............... | F16K 5/0647 |
| | | | | 137/271 |
| 6,415,819 B1* | 7/2002 | Pas | ..................... | F16K 35/14 |
| | | | | 137/637.1 |
| 7,201,003 B2* | 4/2007 | Clarke | ................. | F16K 17/16 |
| | | | | 62/51.1 |
| 9,586,685 B2 | 3/2017 | Burd | | |
| 2002/0125456 A1* | 9/2002 | Rauch | ................ | F16K 31/043 |
| | | | | 251/337 |
| 2006/0214419 A1 | 9/2006 | Heuer | | |
| 2022/0290766 A1 | 9/2022 | Brandt | | |

\* cited by examiner

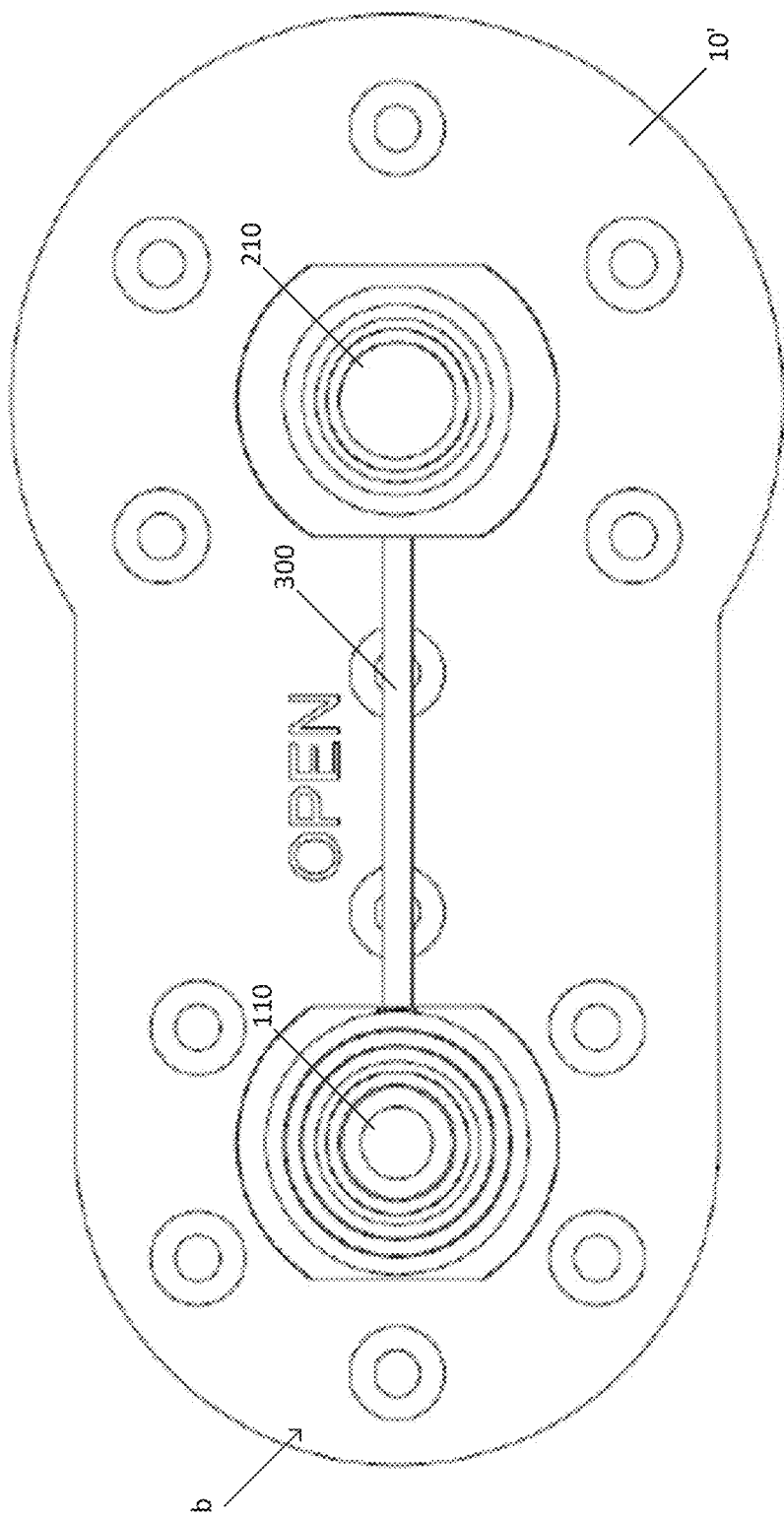

WATER PORT CLOSURE ASSEMBLY

CROSS-REFERENCE TO RELATED APPLICATIONS

This application claims priority to, and the benefit of, EP Patent Application No. 23461505.2, filed Jan. 26, 2023 and titled "WATER PORT CLOSURE ASSEMBLY," which is incorporated by reference herein in its entirety for all purposes.

FIELD

The present disclosure is concerned with providing a closure assembly for ports in a water system, such as the fill and overflow ports of a water system. The water system can, for example, be a system for providing potable or fresh water in an aircraft.

BACKGROUND

Water systems often include a tank or storage vessel to store water which can then be plumbed to other parts of the system to provide water to different parts of the system from the storage tank/vessel. The tank will need to be periodically re-filled. Typically, the tank is provided with a fill port to which a fill line, connected to a source of water, is connected for re-filling the tank from the source. The tank may also be provided with an overflow or overfill line via which water can exit the tank if the tank is overfilled. The overflow water exits from an overflow port on the tank. During the tank filling process, the fill port, and, where present, the overflow port, will be open. In some applications, the ports are left open after filling. The ports may be provided in an operating panel that is covered by a door or panel when not in use. In certain environments, e.g. where the tank is subjected to movement or vibration or in environments where debris or contaminants exits which should not be allowed to get into the tank, a closure or cap assembly is provided at the ports to close the port(s) when not being filled. In an arrangement with a fill port and an overflow port, each port may be provided with its own cap or closure or, alternatively, a single closure can be provided that covers both ports, when closed. Such assemblies may be used, for example, in aircraft. An aircraft typically has water stations in the cabin for dispensing drinking water during flight. The aircraft has a storage tank filled with potable water and plumbing to provide water from the tank to the stations as required. The tank is re-filled between flights by ground crew, by connecting an external source of water, e.g. a water truck, to the tank via a hose connected to the fill line attached to the fill port.

Whilst existing closure arrangements are effective in closing the ports, they are typically hinged relative to the ports in such a way that they require a large area around the ports to allow them to open and close. Typically, an arm or lever is attached to the caps and is moved in a large arc to open the caps. In environments where space is limited e.g. in aircraft, this is undesirable and there is a need for an improved port closure assembly that provides effective closure but also allows the closure to be opened and closed within a limited space. In addition, repeated opening and closing of the closure components about a hinge causes wear and means that the parts need to be replaced long before their life would otherwise expire.

SUMMARY

According to the disclosure, there is provided a fill port assembly comprising: a housing having an opening therethrough; a fill port located in and extending through the opening defining a flow channel through the fill port from a first end to a second end, the flow channel having an axis defined between the first end and the second end; and a closure mechanism moveable between an open position in which the flow channel is open and allows fluid flow therethrough and a closed position in which the flow channel is closed and prevents fluid flow therethrough, wherein the closure mechanism comprises: a ball located in the flow channel, the ball having a passage therethrough, the ball being rotatable within the flow channel such that in the open position, the passage is aligned with the flow channel and in the closed position, the passage is not aligned with the flow channel; and actuator means for causing rotation of the ball in response to axial movement, with respect to the axis of the flow channel, of the actuator means.

BRIEF DESCRIPTION OF THE DRAWINGS

Examples of the assembly according to this disclosure will be described by way of example only and with reference to the drawings. It should be noted that variations are possible within the scope of the claims.

FIG. 9 is a top view of an assembly as shown in FIG. 5 in the open position.

DETAILED DESCRIPTION

Figure 1:
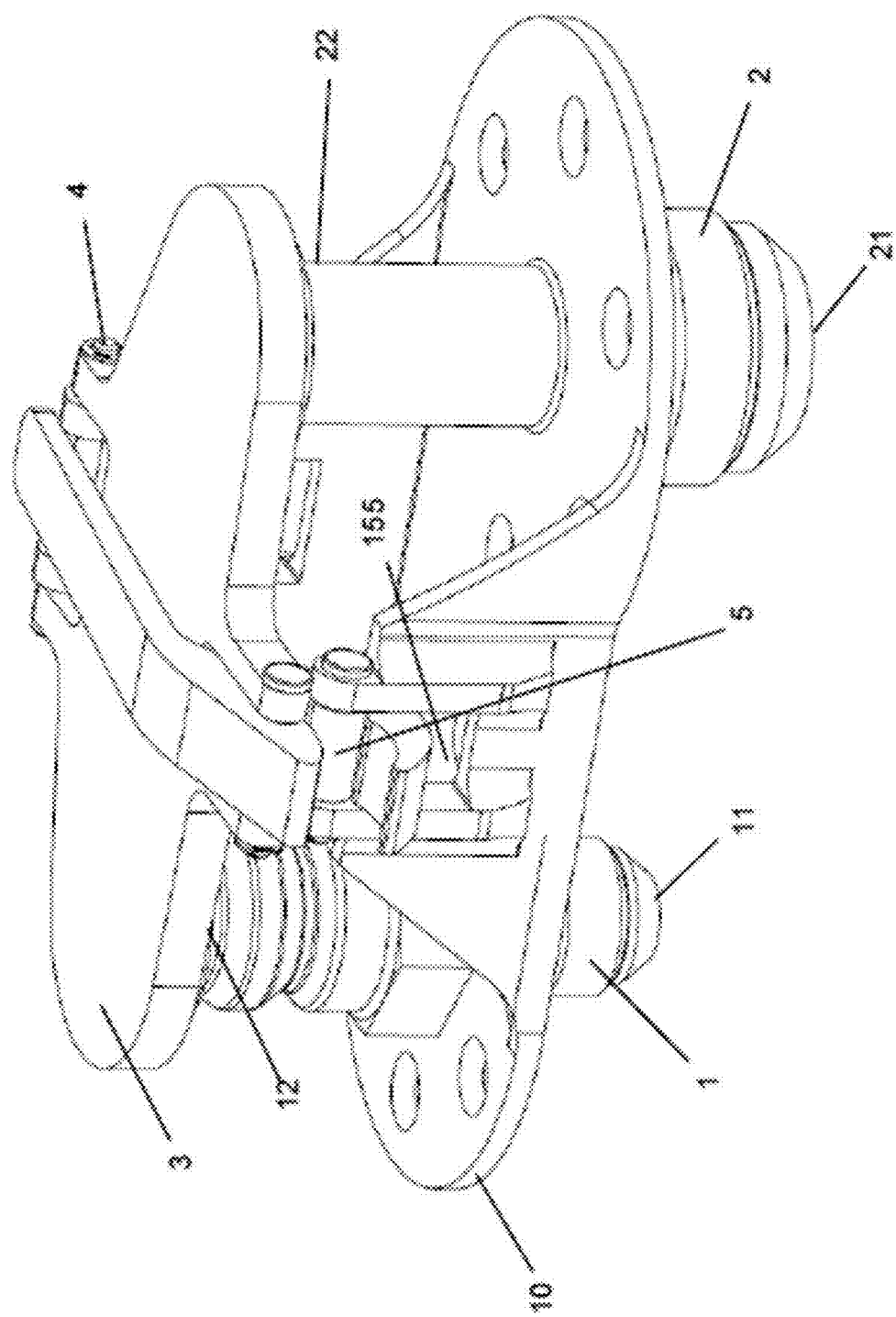
FIG. 1 is a perspective view of an example of a known closure assembly for a fill port and an overflow port of a water system.

By way of background, an example of a known port closure assembly will first be described, with reference to FIGS. 1, 2A and 2B.

In this assembly, a fill port 1 and an overflow port 2 are provided in a housing 10. These will be in fluid connection at a first end 11, 21 with the storage tank or other vessel to be filled via the fill port. The second end 12 of the fill port 1 is provided with a respective fitting 31 configured to be fluidly connected to a fill line (not shown) when the tank is being filled. The second end 22 of the overflow port 2 is provided with a fitting configured to be fluidly connected to an overflow line (not shown). A cap 3 is provided to cover the second ends 12, 22 of the fill and overflow ports in the closed state. In the example shown, a single cap is provided that covers both ports 1, 2 as this simplifies the closing operation by the user and reduces the risk of a port being inadvertently left open after filling. Other known assemblies have a separate cap for each port.

The cap 3 is mounted to the assembly housing 10 by a hinge arrangement 4 adjacent the second ends of the ports, and is provided with a lever and latch mechanism 5 to open and close the cap 3. The inner surface of the cap, that comes into contact with the second end of the port(s) when closed, is preferably provided with a seal 6. An additional seal, such as an O-ring seal 7, may also be provided around the second end of the port(s). The inner surface of the cap may be formed with respective plugs or protrusions 41, 42 arranged to fit into the port fittings when the cap is closed.

In the example, the latch and lever mechanism includes a lever 15 having a lever body 151, a lever end 152 and a latch end 153. When the cap 3 is in the closed position, the lever body 151 lies across the outer surface of the cap, essentially flat against the cap, with the lever end 152 adjacent the hinge 4. The latch end 153 includes a catch or claw 154 that secures in a recess or detent 155 on the side of the housing opposite the hinge 4. The closed position is shown in FIG. 2A.

Figure 2A:
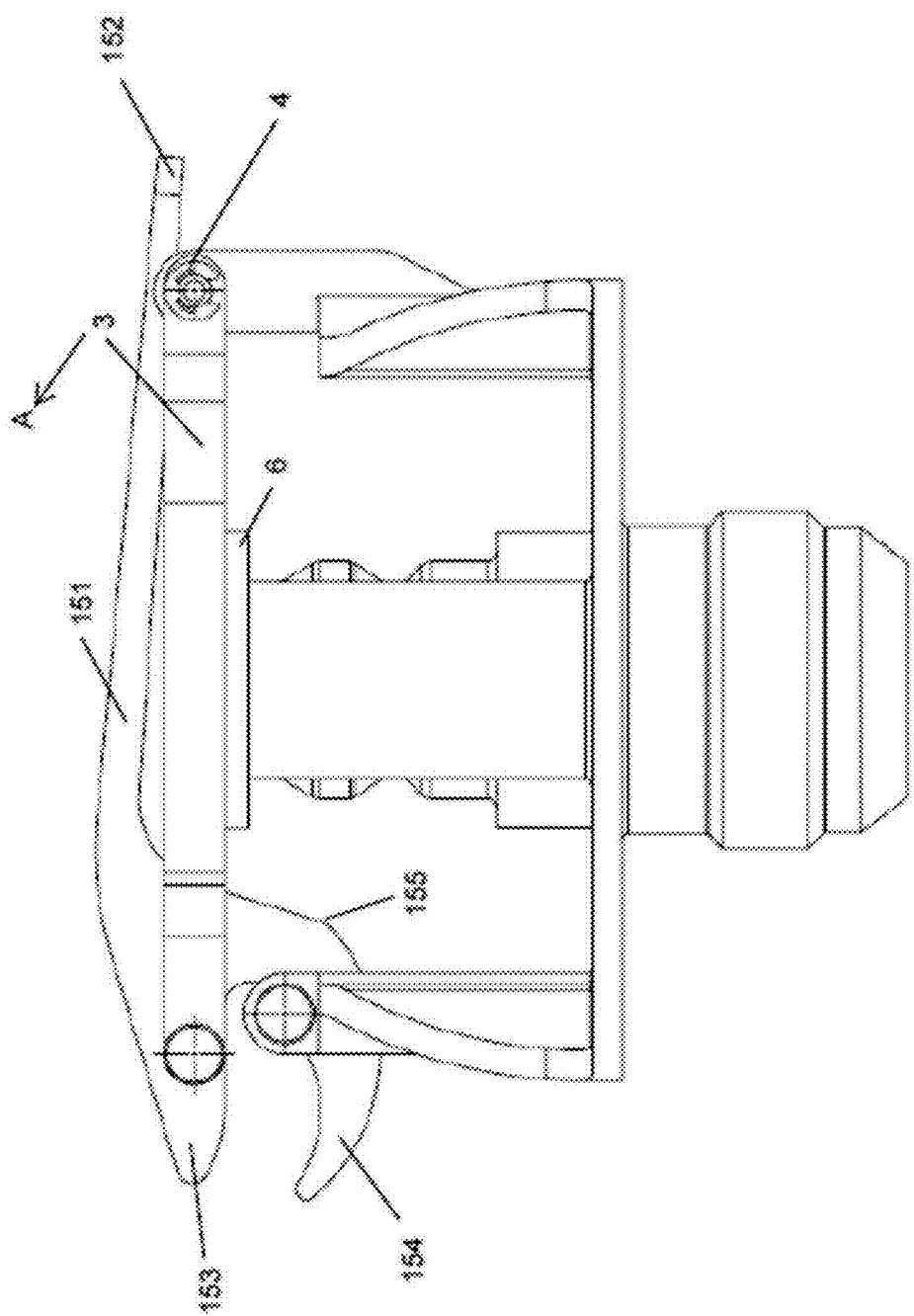
FIGS. 2A and 2B illustrate, respectively, an assembly such as that shown in FIG. 1 in the closed and opened positions.

To open the cap 3, the lever end 152 first needs to be lifted away from the cap, in the direction of arrow A in FIG. 2A to cause the latch end 153 to move the claw 154 out of engagement with the detent 155. The lever 15 is then moved in an arc movement (arrow B in FIG. 2B) about the hinge 4. As the latch end of the lever is attached to the cap 3 (e.g. by a pin 8), the movement of the latch causes corresponding movement of the cap 3 about the hinge 4 to move the cap 3 out of engagement with the second end of the port(s) (FIG. 2B). In an example, not shown, where each port has its own cap, the opening motion would be similar for each cap 3.

To close the cap 3, the lever 15 is then moved in an arc relative to the housing (arrow C in FIG. 2B) opposite to the opening direction B, moving the lever and the cap about the hinge 4 to close over the port and to bring the latch end 154 into engagement with the detent 155. The lever is then brought down (arrow D) towards the outer surface of the cap 3 to the original position, essentially flat against the cap 3 (FIG. 2A) and the latch end locks behind the detent.

Figure 2B:
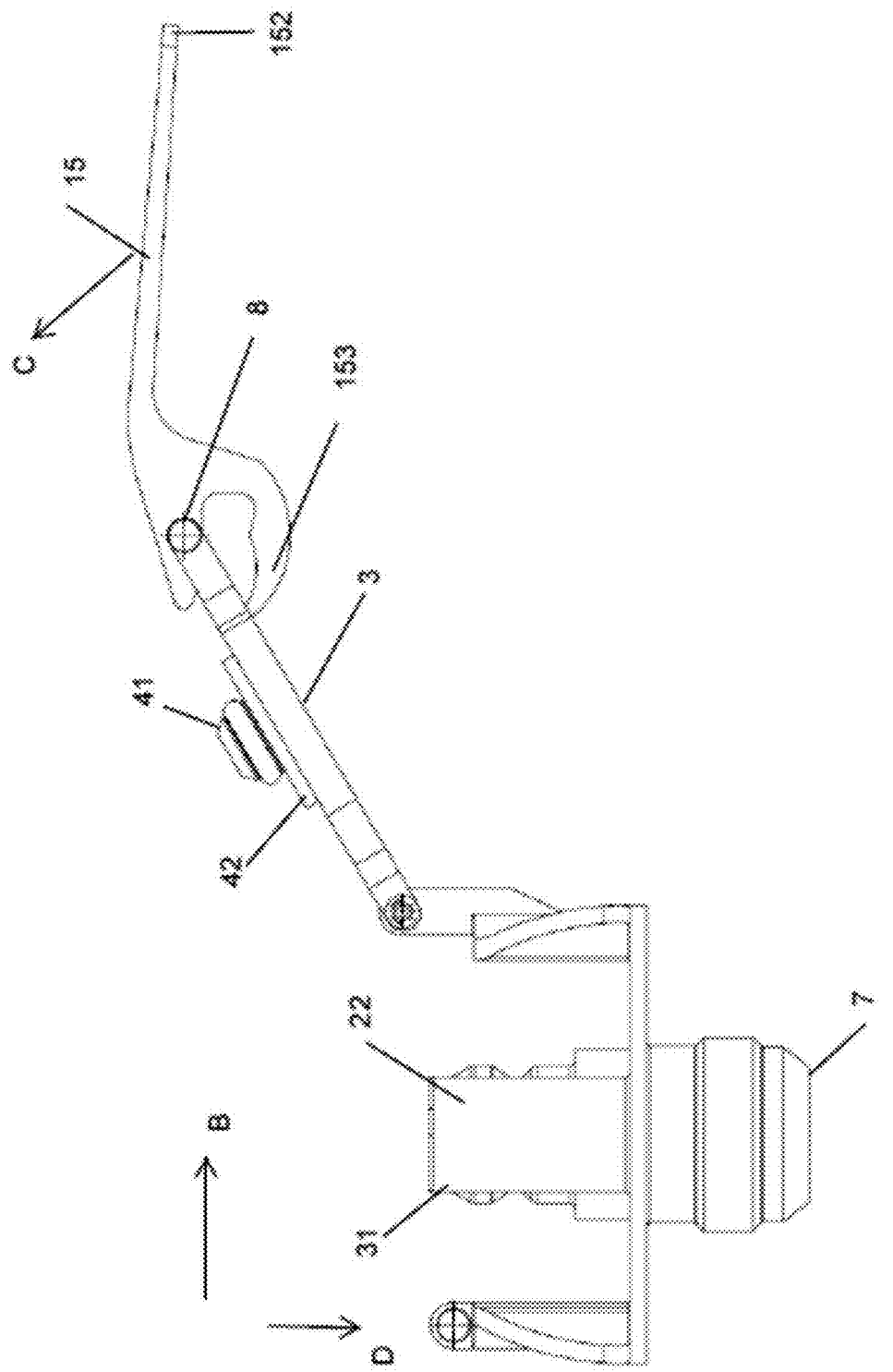
Figure 3:
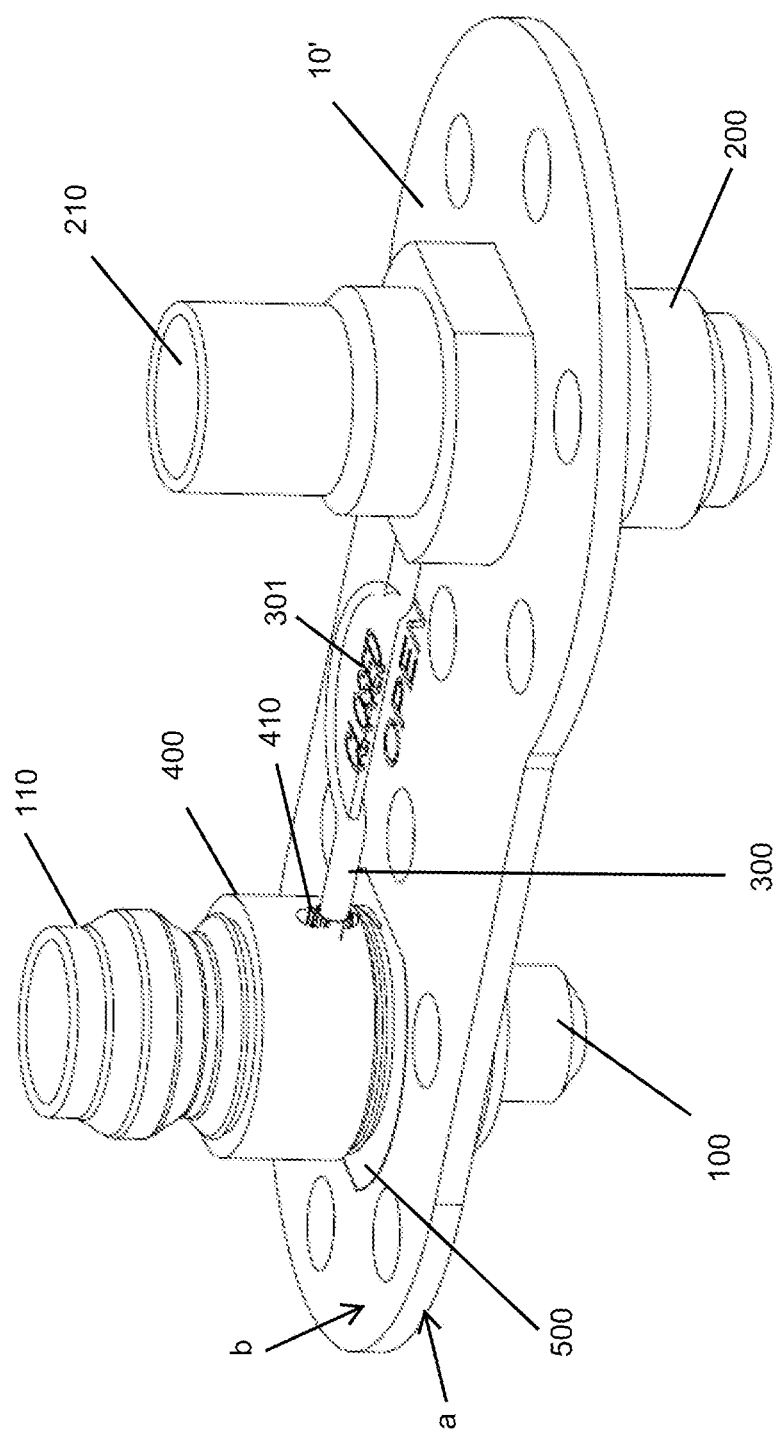
FIG. 3 is a perspective view of an example of a closure assembly according to this disclosure.
Figure 4:
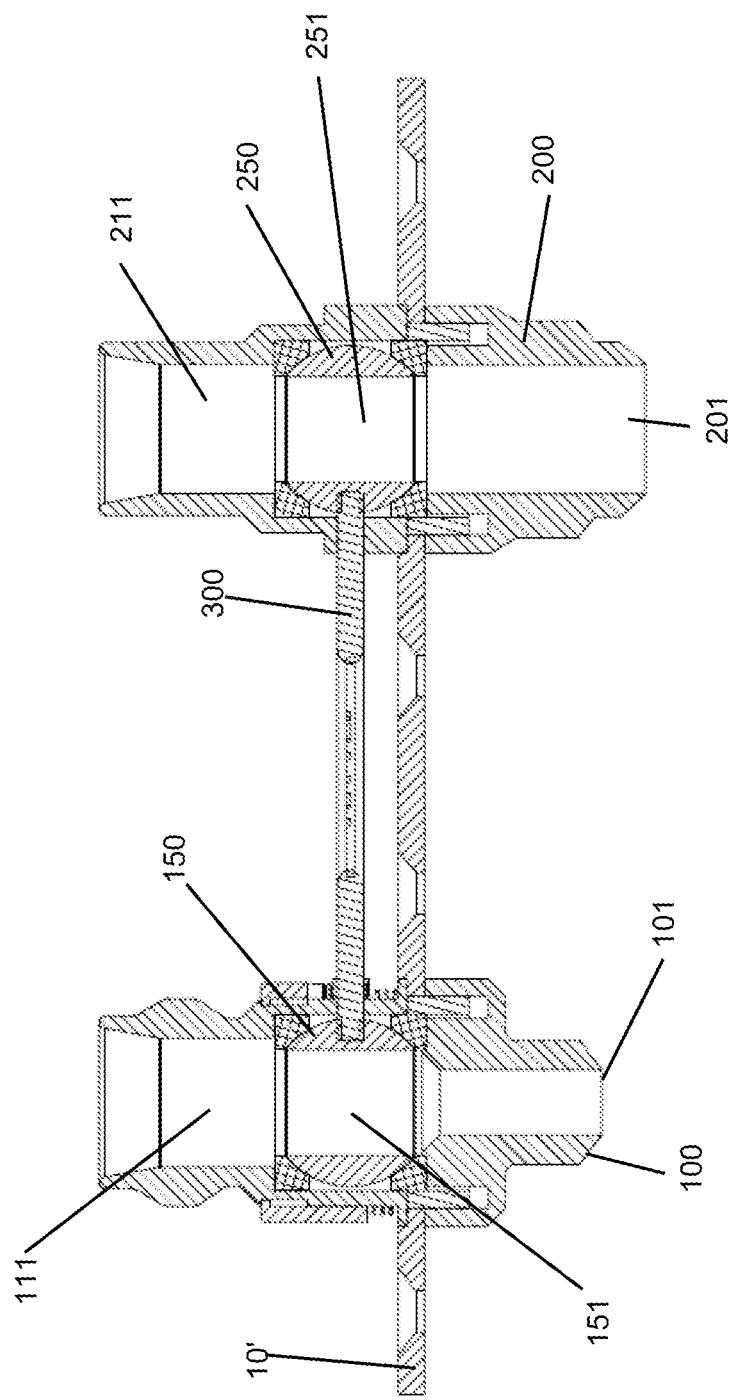
FIG. 4 is a side view of a closure assembly as shown in FIG. 3 in the open position.

As can be seen from, in particular, FIG. 2B, the arcuate motion of the lever and the cap defines a large range of movement relative to the size of the overall assembly and would require a large area above the ports to allow the cap to be opened and closed.

Another problem that has been observed with such assemblies, is that due to the hinge arrangement between the cap and the port, the seals on the inner surface of the cap and/or between the cap and the port or fitting suffer from unequal loading during opening and closing of the caps. The parts of the seal closer to the hinge will become pinched and suffer excess loading compared to the seal parts further away from the hinge. Also, because of the rotational motion in bringing the cap into position on the port, there is a risk that the cap parts will not immediately locate in the correct central position, and can press on the seals. This can cause uneven wear on the seals and adversely affect their proper functioning.

The repeated movement of the lever about the hinge also causes wear of the closure parts including the hinge part of the housing. As this is formed integrally with the housing, which is a fully machined part, such a housing is expensive and time consuming to manufacture.

The present disclosure provides an improved closure assembly that requires less space to open and close the cap(s), and is smaller and simpler and less expensive to manufacture. The assembly can also address the problem of uneven wear on the seals and wear on the latch and hinge parts. An example will be described with reference to FIGS. 3 to 10.

In the same way as shown in FIGS. 1 and 2, the closure assembly of the disclosure is provided for a fill port 100 and an overflow port 200 provided in a housing 10'. As in the example described above, the first end 101 of the fill port and the first end 201 of the overflow are configured to fluidly connect to the storage tank. The fittings 110 and 210 at the second ends of the ports are configured to, respectively, fluidly connect to the fill line and the overflow line (not shown) during filling. A flow channel 111, 211 extends from the fittings, through the port, to the first ends. The closure assembly of this disclosure is, however, different to the known assembly described above. Rather than the closure being in the form of a cap provided over the fill ports, the closure is formed within the fill port as will be described further below, and is activated to open when a fill hose is connected to the port and/or to close when a fill hose is detached from the port.

According to the disclosure, the closure comprises a form of ball valve located in the body of the port. In the examples shown, two ports 100, 200 are provided on a single housing 10' and each has a ball valve closure 150, 250 located within the flow channel 111, 211 between the first end 101, 201 and the second end 110, 210 of the port. The principles of the disclosure, described further below, however, also apply to a single port. The ball valve closure 150, 250 is a ball having an open passage 151, 251 extending therethrough, the ball being rotatable relative to the port 100, 200 body such that, when the ball valve closure is in an open position, the passage 151, 251 aligns with the flow channel 111,211 to allow fluid to flow through the port from the fitting to the first end. The ball is rotatable relative to the port such that when the ball valve closure is in a closed position, the passage 151, 251 is not aligned with the channel- and, in the embodiment shown, extends through the ball in a direction perpendicular to the channel. The ball, therefore, is positioned to present a closed face to the flow channel thus blocking flow from the fitting to the first end of the port.

The way in which the ball is caused to rotate between the open and closed position will now be described in more detail.

To assist with describing the opening and closing, directions will be described relative to the axis X of the port from its first end to its second end.

The port is mounted relative to the housing 10' such that the axis X passes through from one side a of the housing to the other b. The first end 101, 201 of the port extends axially from one side a of the housing. The second end of the port around which the fitting 110, 210 is provided extends axially from the other side b of the housing.

A rod 300 is connected at a first end 311 to the ball 150 and extends from the ball out of a side wall of the port. A sleeve 400 is mounted around the port exterior to the port around the location where the ball is mounted inside the port. A spring 500 is provided between the sleeve 400 and the second side b of the housing 10' and axially biases the sleeve away from the housing 10' to a first position (the closed position shown in FIG. 5). The sleeve 400 includes an aperture or slot 410 through which the rod 300 extends. Some form of gear configuration is provided between the sleeve and the rod such that axial movement of the sleeve causes rotation of the rod which, in turn, rotates the ball to which it is connected. In the example shown, the aperture or slot 410 is provided with teeth 420 on its inner surface. A toothed cog 320 is provided around the rod 300 where it passes through the slot 410. The cog 320 has radially outwardly extending teeth that engage with the radially inwardly extending teeth 420 on the inner surface of the slot. The cog 320 is fixed to the rod 300 so that the rod and the cog rotate together. The rod is fixed to the ball so that rotation of the rod causes rotation of the ball and, hence, rotation of the cog causes rotation of the ball. The slot and cog gearing ensures a smooth, linear movement of the sleeve leading to rotation of the ball. Other gearing or geometrical connections may be used to ensure rotation of the rod with linear movement of the sleeve.

Figure 5:
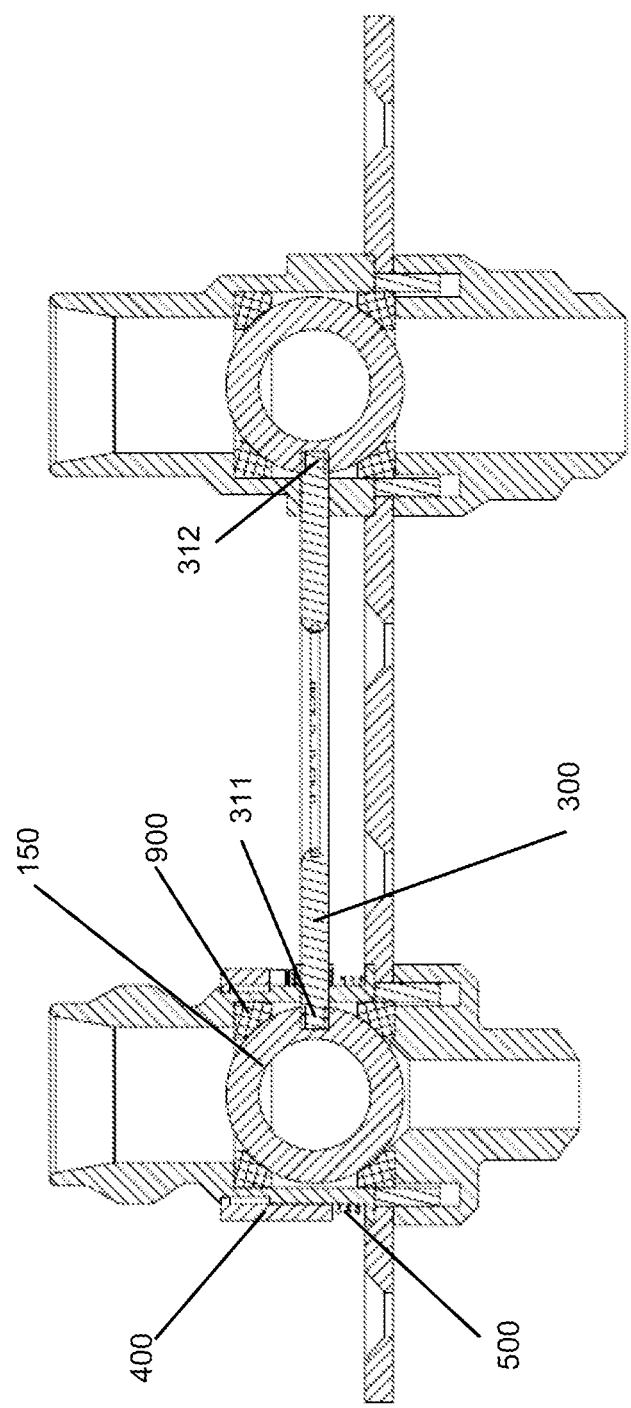
FIG. 5 is a side view of a closure assembly as shown in FIG. 3 in the closed position.
Figure 6:
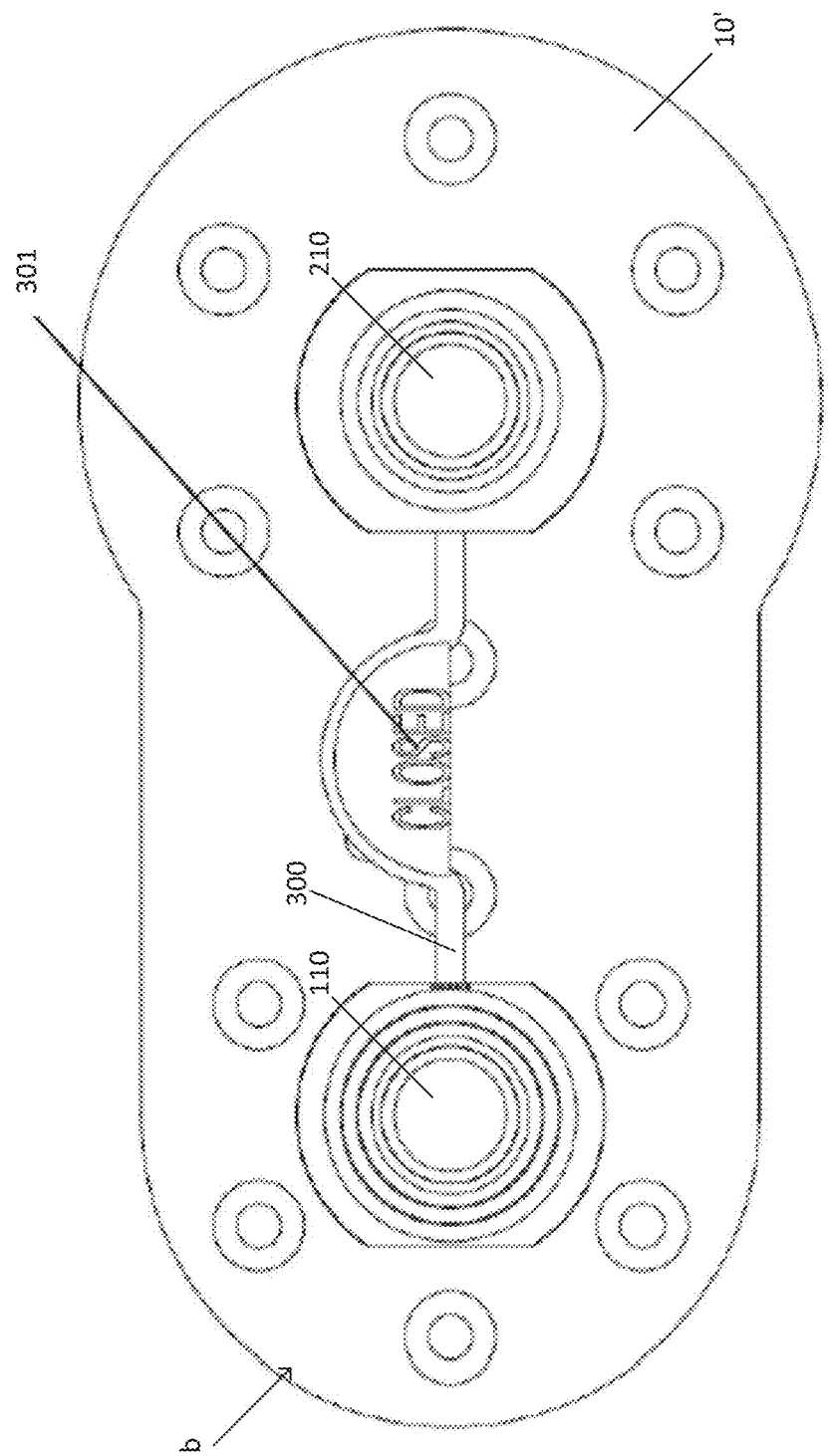
FIG. 6 is a top view of an assembly as shown in FIG. 5.

The connection between the rod and the ball and the engagement of the teeth of the cog and the teeth of the slot are configured such that when the spring is in its default state, biasing the sleeve 400 away from the housing 10' the rod engages via the engagement of the teeth in a rotational position in which the connected ball is in the closed position as shown in FIG. 5.

Figure 7:
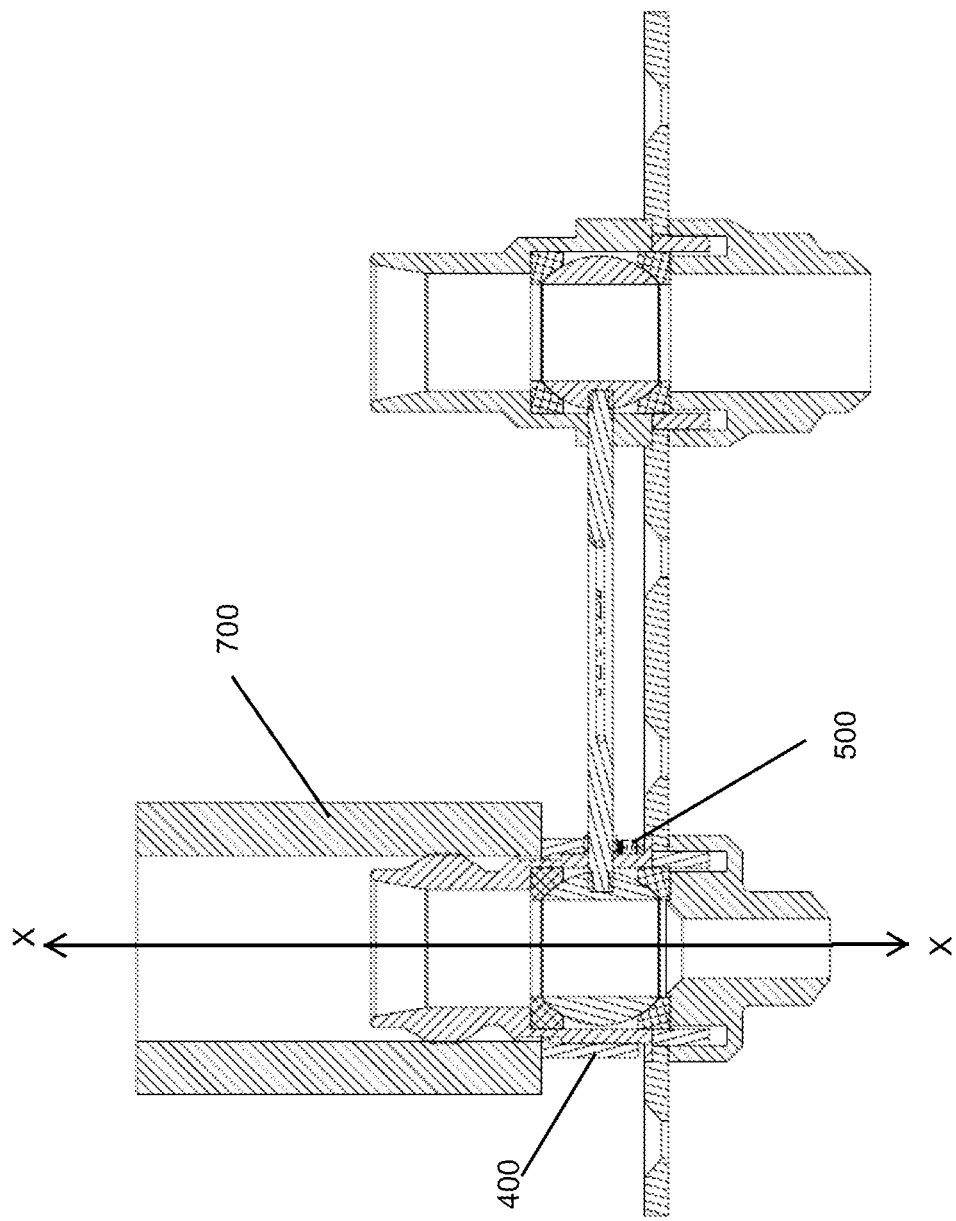
FIG. 7 shows a side view of the assembly in a closed position in use.
Figure 8:
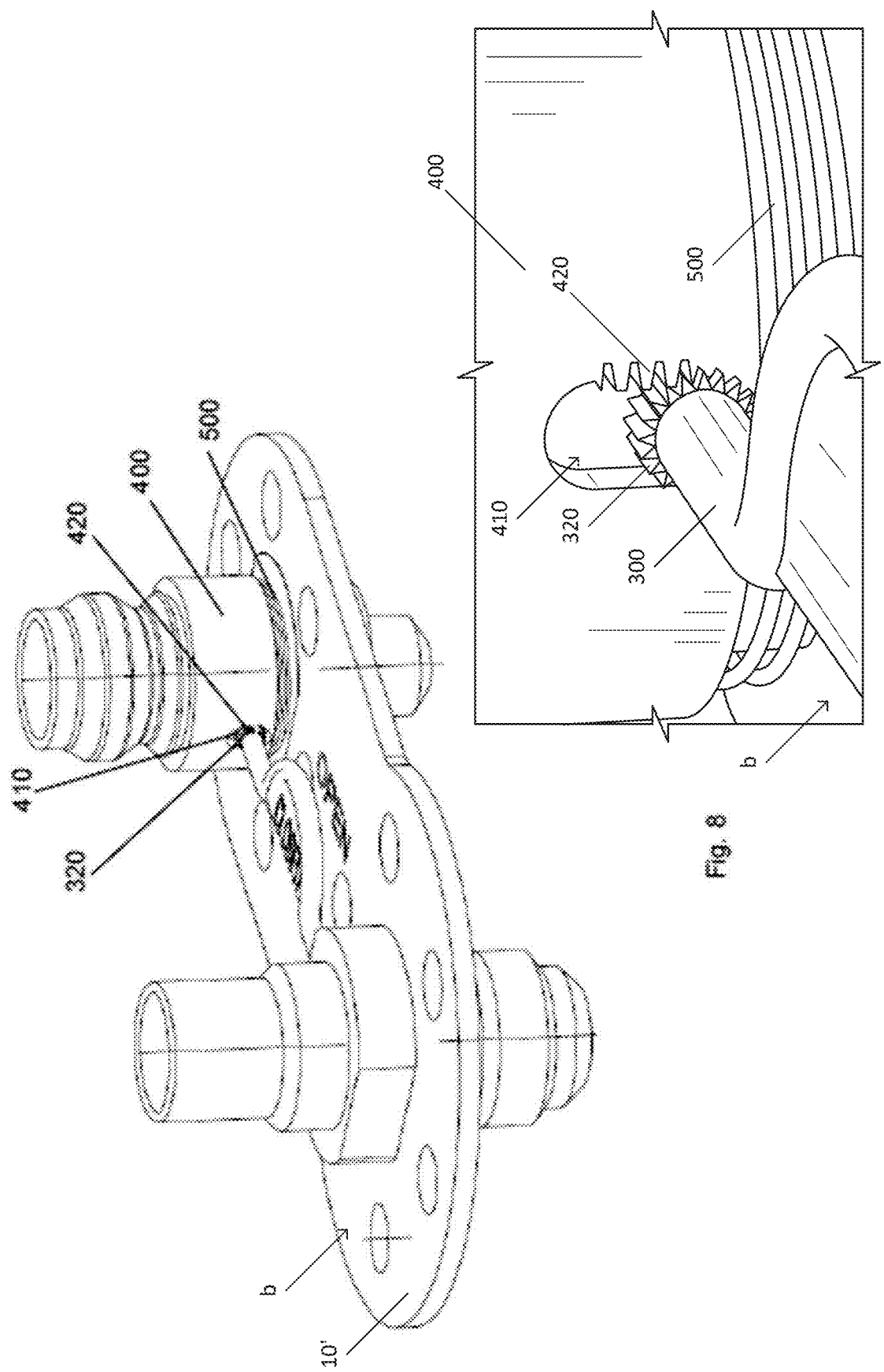
FIG. 8 shows a detail of the mechanism for closing the assembly.

When the port is to be operated as a fill or overflow port, a hose 700 is pushed onto the fitting 110. The sleeve and the spring are arranged such that when the hose is pushed onto the fitting, the hose pushes down against the sleeve which, in turn, pushes against the force of the spring, compressing the spring. As the sleeve moves downwards against the force of the spring, the engagement of the teeth of the slot and the teeth of the cog causes the cog to rotate. This, in turn, causes rotation of the rod 300 which, in turn, rotates the ball to the open position, as shown in FIG. 7. The interaction between the teeth of the slot and the cog can best be seen in FIG. 8.

When the hose 700 is removed, the spring 500 will relax—i.e. expand, thus pushing the sleeve upwards again. The movement of the slot relative to the cog and rod will cause rotation of the cog, and thus the rod and consequently the ball, in the opposite direction, to the closed position.

The rod 300 is preferably arranged such that it can be manually rotated by a user should the sleeve and spring configuration fail.

In the example shown, having two ports 100, 200, the ball valve closures 150, 250 may be connected by a single common rod 300, one end 311 of which is connected to the ball 150 of the fill port 100, the other end 312 of which is connected to the ball 250 in the overflow port.

The rod 300 may also be provided with an indicator to indicate, based on the angle of rotation of the rod, whether the ball valve closures are in the open or closed position. For example, a tab or flag 301 may be mounted to or extend from the rod in a way such that when the ball valve closures are in the closed state, the tab indicates that the closure is closed by visually presenting, to a user, e.g. the word 'closed' (as seen in e.g. FIG. 6), or a color or other symbol representative of a closed state; when, on the other hand, the closures are open, the indicator will provide an indication of the open state. The connecting rod 300 will also ensure that both ball valve closure are open or closed at the same time. Thus, as a hose is attached to the fill port, the overflow port will also automatically open. Both the common rod and the indicator are independently, and in combination, optional features. Each port could have its own rod. In the case where the closure is only provided in one port, a state indicator could be provided, if desired, e.g. by means of an external flag or indicator that is connected to rotate with the ball to provide a different indication depending on whether the closure is closed or open. Again, such an indicator is, however, optional.

To avoid leakage, but, at the same time, to allow smooth rotation of the ball between the open and closed positions, seals, e.g. Teflon™ seals 900 may be mounted around the ball within the port.

Figure 10A:
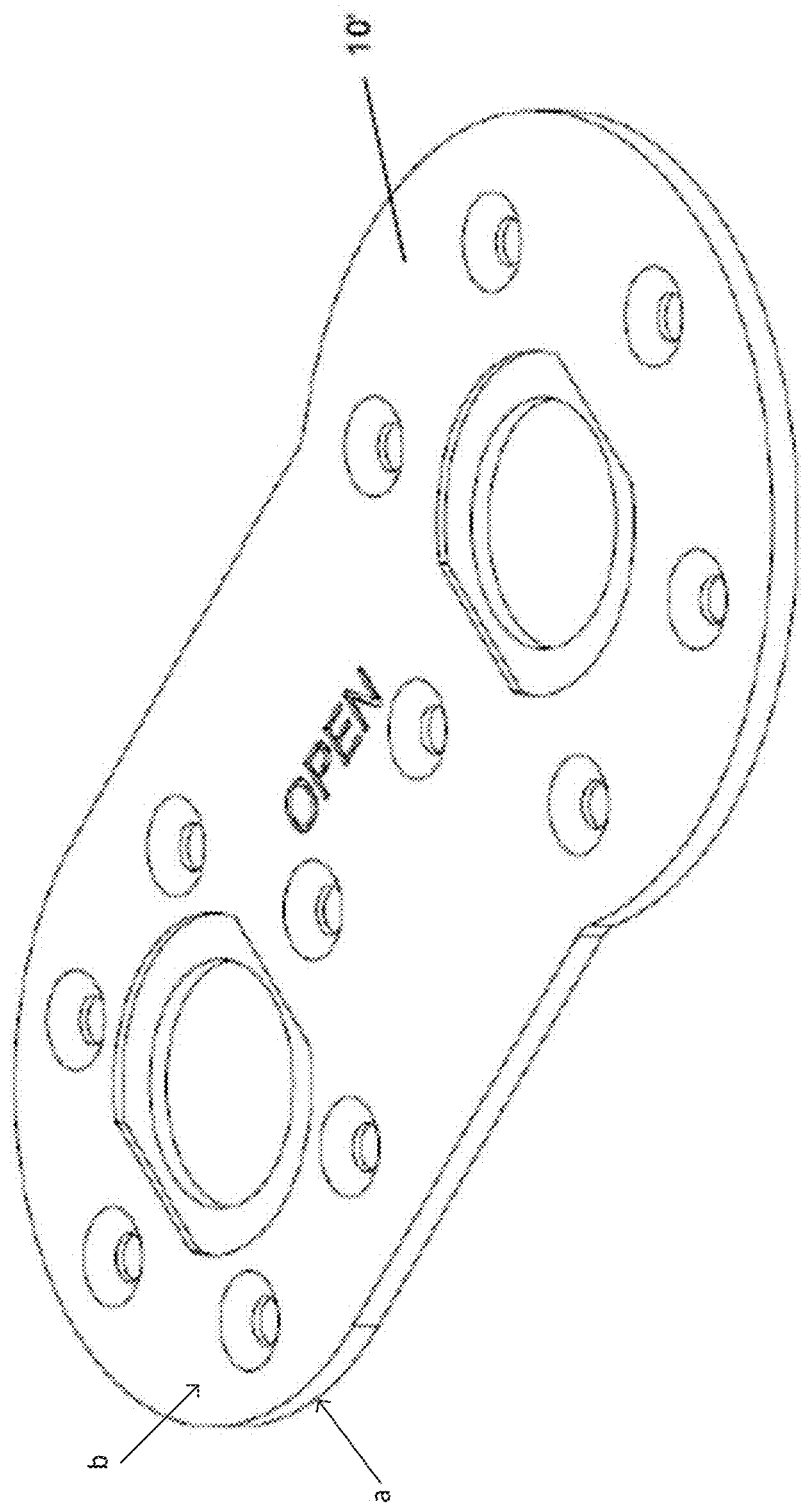
FIGS. 10A and 10B show, for comparison, a housing part of an assembly according to the disclosure and a housing part of a known assembly.
Figure 10B:
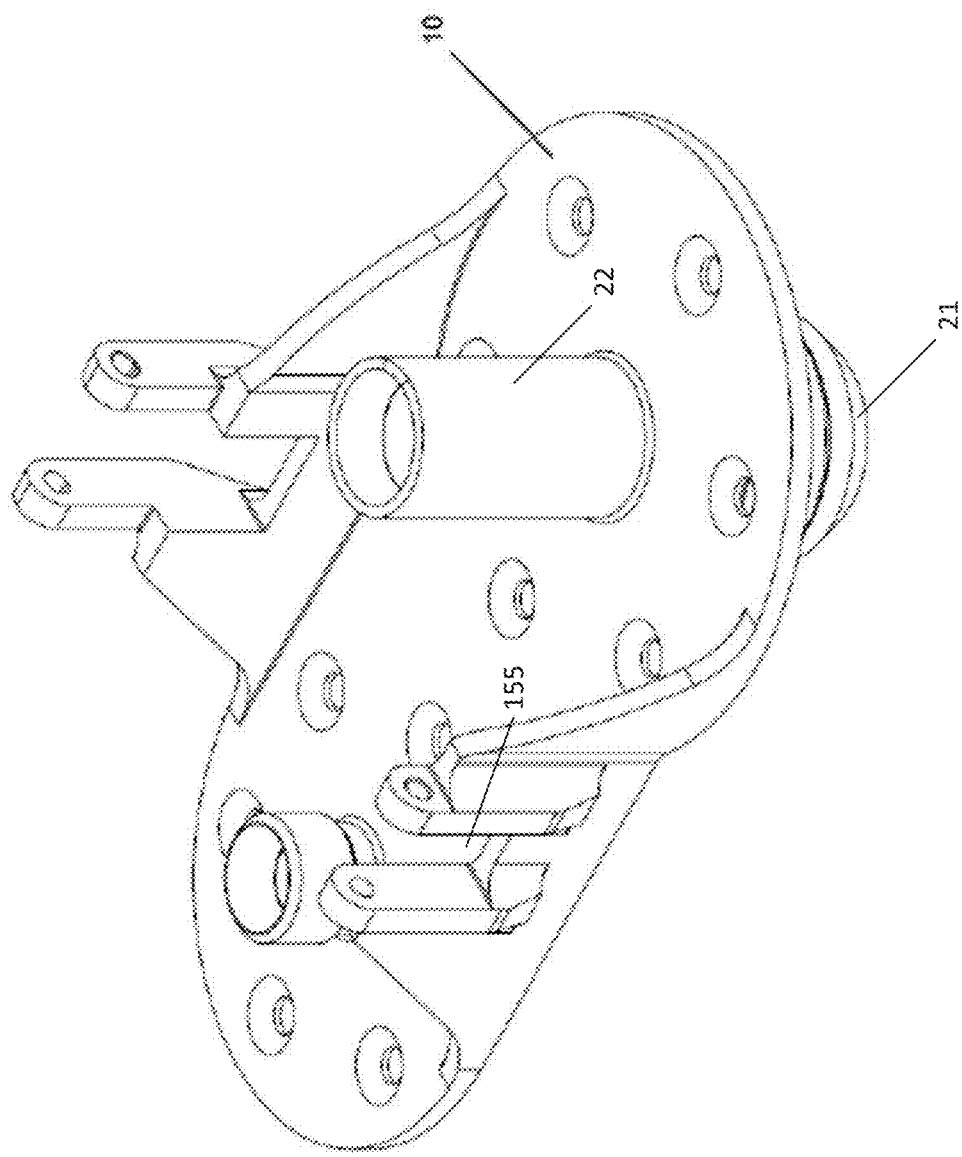

As can be seen by comparing FIGS. 10A and 10B, the housing 10 of the present disclosure is much simpler and lighter and less machined than the housing 10 of the known design. As the housing is usually the most expensive part of the assembly, this is clearly advantageous. Also, a reduction in mass, number of parts and manufacturing costs and complexity is important in many fields including the aircraft industry.

The design of the disclosure avoids the need for flaps and hinges and so reduces the adverse effects of wear of those parts. By having the closures internal to the ports and opened automatically on attachment of a hose, the opening and closing function requires much less space and the envelope of the assembly is greatly reduced. Furthermore, the assembly can be easily inspected for damage.

What is claimed is:

1. A fill port assembly comprising:
   a housing having an opening therethrough;
   a fill port located in and extending through the opening defining a flow channel through the fill port from a first end to a second end, the flow channel having an axis defined between the first end and the second end;
   a first ball valve closure located in the flow channel, the first ball valve closure having a passage therethrough, the first ball valve closure being rotatable within the flow channel such that, in an open position, the passage is aligned with the flow channel and, in a closed position, the passage is not aligned with the flow channel;
   a rod coupled to the first ball valve closure, the rod being rotatable to move the first ball valve closure between the open and closed positions, the rod having a first end and a second end, and the rod configured with a toothed cog fixedly coupled proximate the first end of the rod; and
   a sleeve arranged around and axially moveable relative to the fill port, the sleeve comprising teeth on an inner surface of a slot through which the rod extends, the teeth configured to engage with teeth on the toothed cog of the rod, the sleeve configured for causing rotation of the first ball valve closure via the rod in response to axial movement of the sleeve, with respect to the axis of the flow channel.

2. The fill port assembly of claim 1, wherein the first ball valve closure further comprises a spring to axially bias the actuator means in the closed position.

3. The fill port assembly of claim 1, wherein axial movement of the sleeve towards the first end of the fill port causes the closure to move to the open position.

4. The fill port assembly of claim 1, the housing having a second opening therethrough, a second fill port located in and extending through the second opening defining a second flow channel through the second fill port from a first end to a second end, the second flow channel having a second axis defined between the first end and the second end; and
   a second ball valve closure located in the second flow channel, the second ball valve closure having a second passage therethrough, the second ball valve closure being rotatable within the second flow channel such that in the open position, the second passage is aligned with the second flow channel and in the closed position, the second passage is not aligned with the second flow channel, the second ball valve closure coupled to the second end of the rod, wherein, responsive to the axial movement of the sleeve, the second ball valve closure is rotated commensurate with the ball valve closure.

5. The fill port assembly of claim 1, wherein the fill port is configured to have a hose attached thereto, at the second end, and wherein attachment of the hose causes axial movement of the closure mechanism to move the closure mechanism to the open position.

6. The fill port assembly of claim 1, for attachment to a water system.

7. The fill port assembly of claim 6, wherein the water system is a water system of an aircraft.

* * * * *